United States Patent
Aoyama

(10) Patent No.: US 8,627,417 B2
(45) Date of Patent: Jan. 7, 2014

(54) LOGIN ADMINISTRATION METHOD AND SERVER

(75) Inventor: Ken Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1192 days.

(21) Appl. No.: 11/639,342

(22) Filed: Dec. 15, 2006

(65) Prior Publication Data

US 2008/0034411 A1 Feb. 7, 2008

(30) Foreign Application Priority Data

Aug. 3, 2006 (JP) ................................. 2006-211826

(51) Int. Cl.
*H04L 29/06* (2006.01)

(52) U.S. Cl.
USPC .......................................................... 726/5

(58) Field of Classification Search
USPC .............. 380/286, 44, 45; 713/164, 165, 166, 713/168, 182, 183, 184, 185, 186; 726/2, 3, 726/4, 5, 6, 7, 8, 26, 27, 28; 709/220, 221, 709/223, 225, 228, 229; 382/115–118
See application file for complete search history.

(56) References Cited

U.S. PATENT DOCUMENTS

| | | | | |
|---|---|---|---|---|
| 5,983,270 | A * | 11/1999 | Abraham et al. | 709/224 |
| 6,157,953 | A * | 12/2000 | Chang et al. | 709/225 |
| 6,801,946 | B1 * | 10/2004 | Child et al. | 709/230 |
| 7,356,601 | B1 * | 4/2008 | Clymer et al. | 709/229 |
| 7,412,720 | B1 * | 8/2008 | Frey et al. | 726/8 |
| 2002/0073213 | A1 * | 6/2002 | Mekata et al. | 709/229 |
| 2002/0112045 | A1 * | 8/2002 | Nirkhe et al. | 709/223 |
| 2003/0005290 | A1 * | 1/2003 | Fishman et al. | 713/156 |
| 2003/0074585 | A1 * | 4/2003 | Charbonneau | 713/202 |
| 2004/0015702 | A1 * | 1/2004 | Mercredi et al. | 713/182 |
| 2005/0005094 | A1 * | 1/2005 | Jamieson et al. | 713/155 |
| 2005/0060581 | A1 * | 3/2005 | Chebolu et al. | 713/201 |
| 2006/0041756 | A1 * | 2/2006 | Ashok et al. | 713/183 |

FOREIGN PATENT DOCUMENTS

| | | |
|---|---|---|
| JP | 2000-207362 A | 7/2000 |
| JP | 2003-216260 A | 7/2003 |
| JP | 2006-178897 A | 7/2006 |

OTHER PUBLICATIONS

Japanese Office Action dated Nov. 15, 2011, issued in corresponding Japanese Patent Application No. 2006-211826.(w/partial English translation).

* cited by examiner

*Primary Examiner* — Eleni Shiferaw
*Assistant Examiner* — Hilary Branske
(74) *Attorney, Agent, or Firm* — Westerman, Hattori, Daniels & Adrian, LLP

(57) ABSTRACT

When a login request in which a network terminal serves as a login destination is received from an administrator terminal, a login request receiving unit of a login administration server causes the administrator terminal to transmit a shared account and fingerprint information. A search engine unit performs a search in an authentication table by using the account and the user fingerprint information as a key, and, when the authentication succeeds, acquires association data including a right upon successful authentication and a login permitted terminal from an association data table. A login request transmitting unit transmits a login request to the network terminal of the login destination so as to achieve login and imparts the right upon successful authentication. Furthermore, the login request transmitting unit transmits a login request to the unprocessed network terminal so as to achieve login and imparts the right upon successful authentication.

6 Claims, 14 Drawing Sheets

FIG. 4

| ENTRY No. | LOGIN SUBSTITUTE RESPONSE TERMINAL |
|---|---|
| 0 | bbbb |
| 1 | cccc |
| 2 | dddd |
| 3 | eeee |

| ENTRY No. | LOGIN TERMINAL | LOGIN ID | AUTHENTICATION INFORMATION |
|---|---|---|---|
| 0 | bbbb | root | FINGERPRINT INFORMATION OF koike |
| 1 | bbbb | root | FINGERPRINT INFORMATION OF aoki |
| 2 | bbbb | root | FINGERPRINT INFORMATION OF tamai |
| 3 | bbbb | admin | FINGERPRINT INFORMATION OF tamai |
| 4 | bbbb | admin | FINGERPRINT INFORMATION OF aoki |
| 5 | bbbb | admin | FINGERPRINT INFORMATION OF tamura |
| 6 | bbbb | admin | FINGERPRINT INFORMATION OF kinjoh |
| 7 | bbbb | admin | FINGERPRINT INFORMATION OF saeki |

28

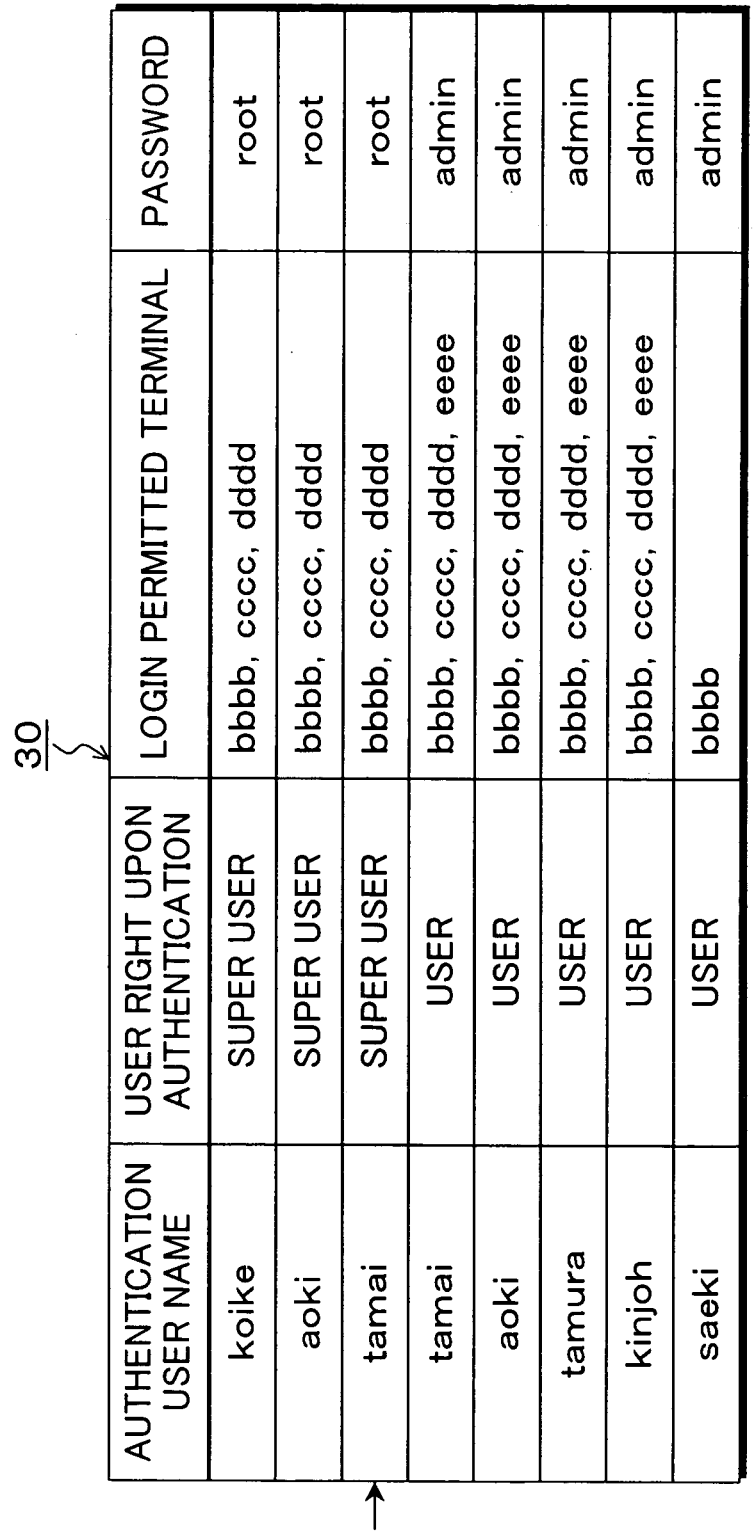

FIG. 6

| AUTHENTICATION USER NAME | USER RIGHT UPON AUTHENTICATION | LOGIN PERMITTED TERMINAL | PASSWORD |
|---|---|---|---|
| koike | SUPER USER | bbbb, cccc, dddd | root |
| aoki | SUPER USER | bbbb, cccc, dddd | root |
| tamai | SUPER USER | bbbb, cccc, dddd | root |
| tamai | USER | bbbb, cccc, dddd, eeee | admin |
| aoki | USER | bbbb, cccc, dddd, eeee | admin |
| tamura | USER | bbbb, cccc, dddd, eeee | admin |
| kinjoh | USER | bbbb, cccc, dddd, eeee | admin |
| saeki | USER | bbbb | admin |

| SHARED ACCOUNT | PASSWORD |
|---|---|
| root | root |
| root | root |
| root | root |
| admin | admin |
| admin | admin |
| admin | admin |
| admin | admin |
| admin | admin |

FIG. 7B 62-2

| USER NAME | SHARED ACCOUNT | PASSWORD |
|---|---|---|
| koike | root | root |
| aoki | root | root |
| tamai | root | root |
| aoki | admin | admin |
| tamai | admin | admin |
| tamura | admin | admin |
| kinjoh | admin | admin |
| saeki | admin | admin |

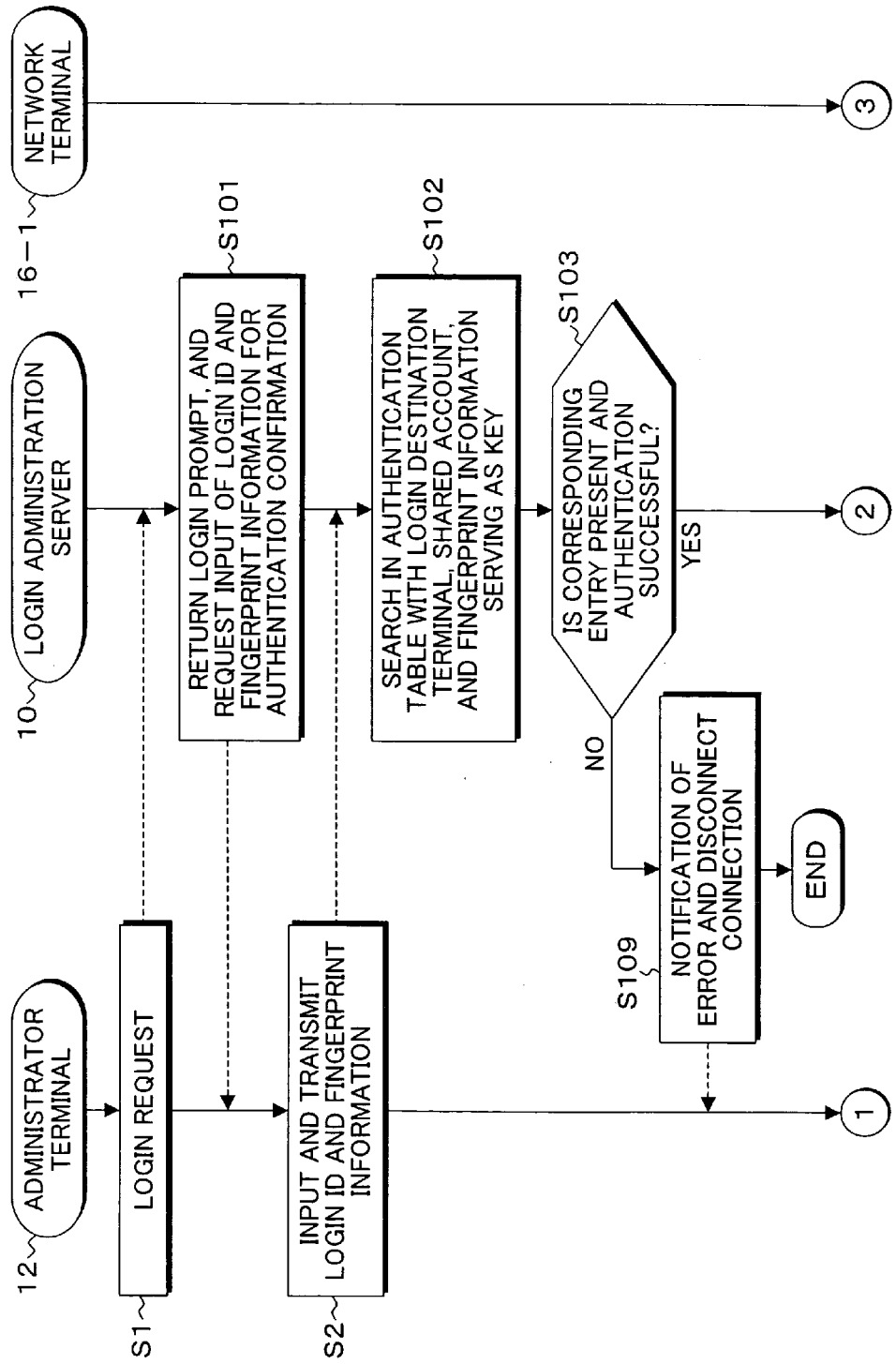

LOGIN ADMINISTRATION METHOD AND SERVER

This application is a priority based on prior application No. JP 2006-211826, filed Aug. 3, 2006, in Japan.

BACKGROUND OF THE INVENTION

1. Field of the Invention

The present invention relates to a login administration method and a server which achieve remote login from an administrator terminal or the like to a terminal which is present on a network via the server through an authentication process using user biometric information such as fingerprints, and particularly relates to a login administration method and a server for subjecting a plurality of terminals to login processes at the same time.

2. Description of the Related Arts

Conventionally, in a computer network system, a wide area network is built not only by connecting a large number of personal computers or workstations on a network, but also by connecting networks, WANs, etc. which are placed at geographically distant locations outside the same building or facility. When distributed administration is performed for such a computer network system, determination upon failure occurrence is difficult, and massive operational cost is taken; therefore, centralized administration utilizing SNMP (Simple Network Management Protocol) installed in many network devices is performed. Administration items of network administration can be generally divided into, for example, constitution administration in which the state of the devices constituting a network is monitored and the operation thereof is controlled, performance administration in which the performance of the devices constituting the network is measured, secret administration in which utilization of information, devices, etc. in the network to resources is limited so as to control utilization of the resources to be correctly performed, and billing administration in which the usage state of the resources in the network is recorded for each user. By acquiring such administration items from the network, a network administrator can always seize the latest network configuration and can appropriately carry out network administration services of checking if unauthorized packets are not transmitted by monitoring the traffic state of the devices, finding unauthorized users from access records so as to prevent intrusion, and seizing the resource utilization state of users so as to advise them about appropriate resource utilization. Furthermore, as a method in which a network administrator remotely connects to and administers network devices, sometimes, they are arranged so that remote connection from an administrator terminal to the network devices can be established by using the TCP/IP Telenet protocol, and, when the network devices are to be subjected to maintenance, required operations are performed by remotely performing login from the administrator terminal to the network devices.

FIG. 1 is an example of a conventional computer network system, wherein an administrator terminal 102 and terminals 104-1 to 104-4 serving as network devices to be administered are connected to a network 100 of Ethernet or the like. In a conventional login process, when login is requested from the administrator terminal 102 serving as a login origin to, for example, the terminal 104-1 serving as a login destination, a login prompt is sent back from the terminal 104-1 to the administrator terminal 102, and therefore a shared account and a shared password the administrator has are transmitted to the terminal 104-1. The terminal 104-1 of the login destination performs a search in an authentication table by using the pair of the received shared account and the shared password as an entry; and, when a matched entry is found, the terminal determines successful authentication, performs a login process, imparts an administrator right registered in the table corresponding to the successful authentication thereto, and permits access from the login origin administrator terminal 102. However, in the login administration method by authentication using the shared account and the shared password, the logged-in user cannot be specified, and the log that, for example, who logged in and did what operations cannot be left. Moreover, file access authority and program execution authority are uniformly and similarly imparted to all the users who know the shared account, and administration troubles such as leakage of the administration authority and forgetting of passwords may occur. In order to solve such problems, as a conceivable login administration method, an authentication method (JP 2006-178897) which uses a shared account and user fingerprint information when imparting file access authority or program execution authority can be utilized.

However, in such a conventional login administration method, when a network administrator is to log in to a plurality of devices present on a network to perform required administration processes, for example, maintenance, the plurality of network devices serving as login targets have to be checked, and a login operation has to be performed for each one of the network devices; thus, there is a problem that login to the plurality of network devices takes labor hours and time. More specifically, in the login administration method using the shared account and the user fingerprint information, as login operations, a login request operation specifying the address of a network device, an input operation of a shared password and a fingerprint input operation using a fingerprint sensor with respect to a login prompt sent from a login destination terminal in response to the login request operation have to be repeated; thus, the login operations take labor hours and time. Moreover, in the fingerprint input operation using the fingerprint sensor, if, for example, a stain is adhered on the sensor, fingerprint information cannot be correctly read/reproduced, authentication fails since it is not matched with the registered fingerprint information in an authentication table, and the fingerprint input has to be repeated.

Furthermore, sometimes, when the number of times of authentication failure of fingerprint matching exceeds a predetermined threshold value, it is determined as unauthorized login so as to lock it. Thus, there is a problem that considerable labor hours and time is taken when login to a large number of network devices is to be performed at the same time.

SUMMARY OF THE INVENTION

According to the present invention to provide a login administration method and a server which enable login to all the devices serving as login targets at the same time by one login operation.

(Method)

The present invention provides a login administration method. The present invention is a login administration method of a server to which a plurality of information processing apparatuses are connected and which performs a login process to a specified second information processing apparatus in response to a login request from a first information processing apparatus, the login administration method characterized by having a login request receiving step of receiving an account and user-specific information from the first information processing apparatus in response to the login request from the first information processing apparatus;

an authentication processing step of authenticating the login request from the first information processing apparatus based on the corresponding relation between the account and the user-specific information received from the first information processing apparatus and an account and user-specific information which are registered in the server in advance; and a login request transmitting step of transmitting a login request including a password corresponding to the authenticated account to the second information processing apparatus.

The user-specific information is biometric information of a relevant user. The account is a shared account shared by the plurality of information processing apparatuses.

In the authentication processing step, upon authentication of the login request, presence of a third information processing apparatus to which the user who uses the first information apparatus can log in is determined; and, in the login requesting step, when the third information processing apparatus is present, the login request including the password is transmitted to the third information processing apparatus.

In the login request receiving step, when an information processing apparatus corresponding to the second information processing apparatus is registered in the server in advance when the login request is received, input of an account and user-specific information is requested to the first information processing apparatus.

In the login request transmitting step, when login to the second information processing apparatus and the third information processing apparatus is achieved, a user right which is registered in the server in advance is imparted to the first information processing apparatus.

In the login request transmitting step, login is achieved by transmitting a user name in addition to the account and the password.

(Server)

The present invention provides a server which performs a login process. The present invention is a server to which a plurality of information processing apparatuses are connected and which performs a process of login from a first information processing apparatus to a second information processing apparatus, the server characterized by having an authentication table in which an account of a login request and user-specific information which is specific to a user who uses the information processing apparatus are registered;

a data table in which a password corresponding to the account is registered;

an authentication processing unit which authenticates the login request from the user in accordance with the corresponding relation between the account and the user-specific information received from the first information processing apparatus in response to a login request from the first information processing apparatus and the account and the user-specific information registered in the authentication table; and a login request transmitting unit which acquires the password associated with the account from the data table in accordance with the authentication of the login request and transmits a login request including the password to the second information processing apparatus.

In another mode of the present invention, a server to which a plurality of information processing apparatuses are connected and which performs a process of login from a first information processing apparatus to a second information processing apparatus, the server is characterized by having an authentication table in which an account of a login request and user-specific information which is specific to a user who uses the information processing apparatus are registered;

a data table in which the information processing apparatus which can be logged in is registered for each of the user;

an authentication processing unit which authenticates the login request from the user in accordance with the corresponding relation between the account and the user-specific information received from the first information processing apparatus in response to a login request from the first information processing apparatus and the account and the user-specific information registered in the authentication table; and a login request transmitting unit which determines the plurality of information processing apparatuses including the second information processing apparatus which can be logged in by the user who is authenticated for the login request by referencing the data table in accordance with the authentication of the login request and transmits a login request to each of the plurality of determined information processing apparatuses.

According to the present invention, based on an authentication process using a shared account and fingerprint information with respect to a plurality of information processing apparatuses present on a network, simultaneous login is enabled, the input operation of a shared account and biometric information such as fingerprint information is not required to be repeated for each information processing apparatus of a login destination, and the operation of login for maintenance or the like from an information processing apparatus of a login origin such as an administrator terminal to a plurality of information processing apparatuses on a network can be simply, readily, and reliably performed.

In addition, the information processing apparatus which are targets of simultaneous login can be readily subjected to new, addition, and change by registration setting with respect to login permitted terminals of a data table corresponding to user fingerprint information of an authentication table.

In addition, when, for example, user fingerprint information is used as authentication information, the access log by which logged in users can be specified can be obtained even if it is login using a shared account, and enhanced security can be ensured. The above and other objects, features, and advantages of the present invention will become more apparent from the following detailed description with reference to the drawings.

BRIEF DESCRIPTION OF THE DRAWINGS

FIG. 4 is an explanatory drawing of the connection administration table of FIG. 3;

FIG. 5 is an explanatory drawing of the authentication table of FIG. 3;

FIG. 6 is an explanatory drawing of the association data table of FIG. 3;

FIGS. 7A and 7B are explanatory drawings of authentication tables provided in network terminals;

FIGS. 10A and 10B are time charts of a login administration process according to the present embodiment;

DETAILED DESCRIPTION OF THE PREFERRED EMBODIMENTS

Figure 1:
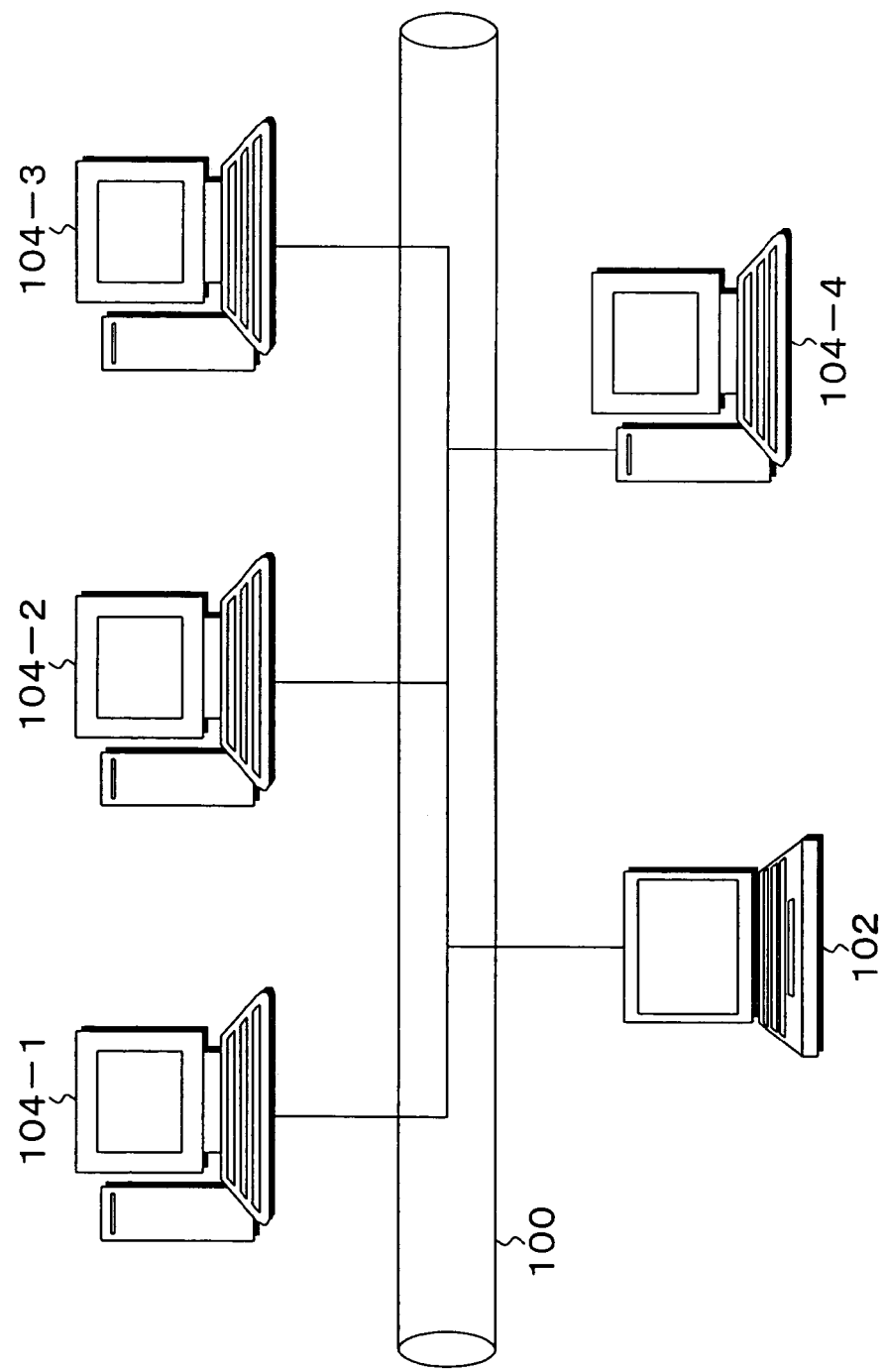
FIG. 1 is an explanatory drawing of a conventional login administration system.
Figure 2:
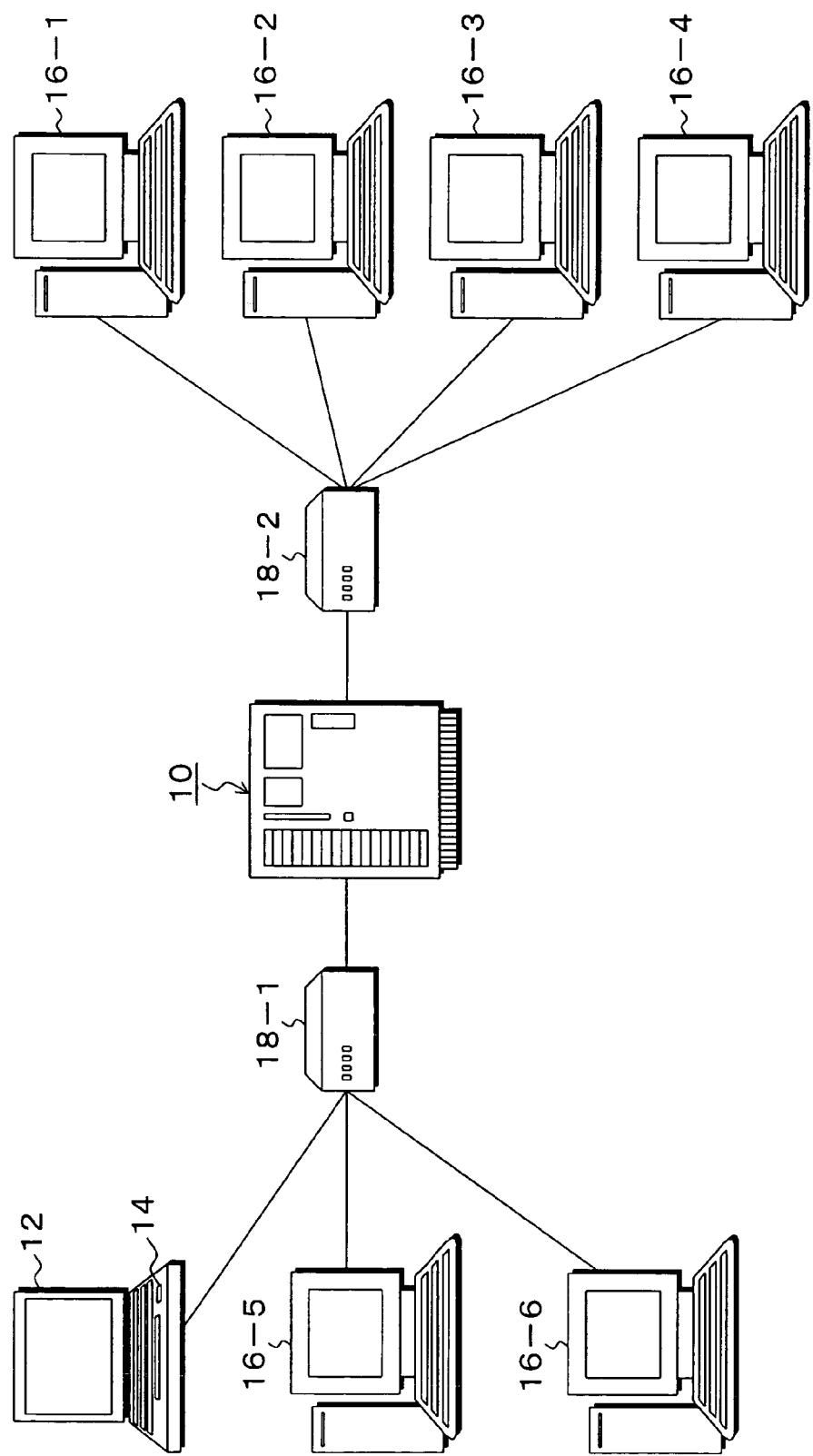
FIG. 2 is an explanatory drawing of a computer network system to which the present invention is applied.

FIG. 2 is an explanatory diagram of a computer network system to which an embodiment of a login administration method of the present invention is applied, wherein a simple system is used as an example in order to simplify explanation. In the computer network system of FIG. 2, a login administration server 10, an administrator terminal 12, and network terminals 16-1 to 16-6 are disposed on a network, the administrator terminal 12 and the network terminals 16-5 and 16-6 are connected to a L2 switch (layer 2 switch) 18-1, the network terminals 16-1 to 16-4 are connected to a L2 switch 18-2, and the login administration server 10 is connected between the L2 switch 18-1 and the L2 switch 18-2. The L2 switch 18-1 is a line connector having a bridging function for accommodating twisted pair cables used in 10-BASE-T or 100B-BASE-TX, analyzes destination MAC addresses of received packets, and operates as a multi-port bridge which transmits the packets at a high speed merely to the ports that are connected to corresponding terminals. As a matter of course, the computer network system of FIG. 2 is an example. In practice, for example, L2 switches, routers, hubs, and L3 switches including L2 switches with router functions are used to build a network, for example, which connects network terminal devices as many as several hundreds, connects to networks which are not only in a particular building or facility but also at other locations via WANs, and connects to the Internet via a proxy server. In such a computer network system, sometimes, maintenance operations are performed for the network terminals 16-1 to 16-6, which are present on the network, by remote operations from the administrator terminal 12 during operation of the network; and, in this case, remote login is performed from the administrator terminal 12 to the network devices serving as targets. In the present embodiment, the login processing from the administrator terminal 12 to the network terminals 16-1 to 16-6 is performed via the login administration server 10. For example, when login from the administrator terminal 12 to the network terminal 16-1 is to be performed, the network terminal 16-1 is specified as a login destination, and login is requested to the login administration server 10. When a response is made to a login prompt which is transmitted in response to the login request from the login administration server 10 to the administrator terminal 12, by inputting a login ID which is a shared account the administrator has and a fingerprint of her/his own by using a fingerprint sensor 14, an authentication process based on the login ID from the administrator terminal 12 and the fingerprint information detected from the fingerprint sensor 14 is executed. When the authentication succeeds, the login administration server 10 requests login to the network terminal 16-1 so as to log into it and permits the administrator terminal 12 to access it with an administrator authority based on the successful authentication. In this course, when other network terminals which are desired to be logged in at the same time as the network terminal 16-1, for example, the network terminals 16-2 to 16-4 are registered in advance in the login administration server 10 side, login to the registered remaining network terminals 16-2 to 16-4 can be performed at the same time by a process in the login administration server 10 side merely by requesting login to the network terminal 16-1 from the administrator terminal 12. The administrator of the administrator terminal 12 can log into the network terminals 16-1 to 16-4, which are grouped as simultaneous login permitted targets, at the same time merely by giving the login request to the network terminal 16-1. In order to enable remote login from the administrator terminal 12 to the network terminals 16-1 to 16-6, in the administrator terminal 12 and the network terminals 16-1 to 16-6 in the present embodiment, functions as Telnet terminals which perform communication processing by the TCP/IP Telnet protocol are implemented.

Figure 3:
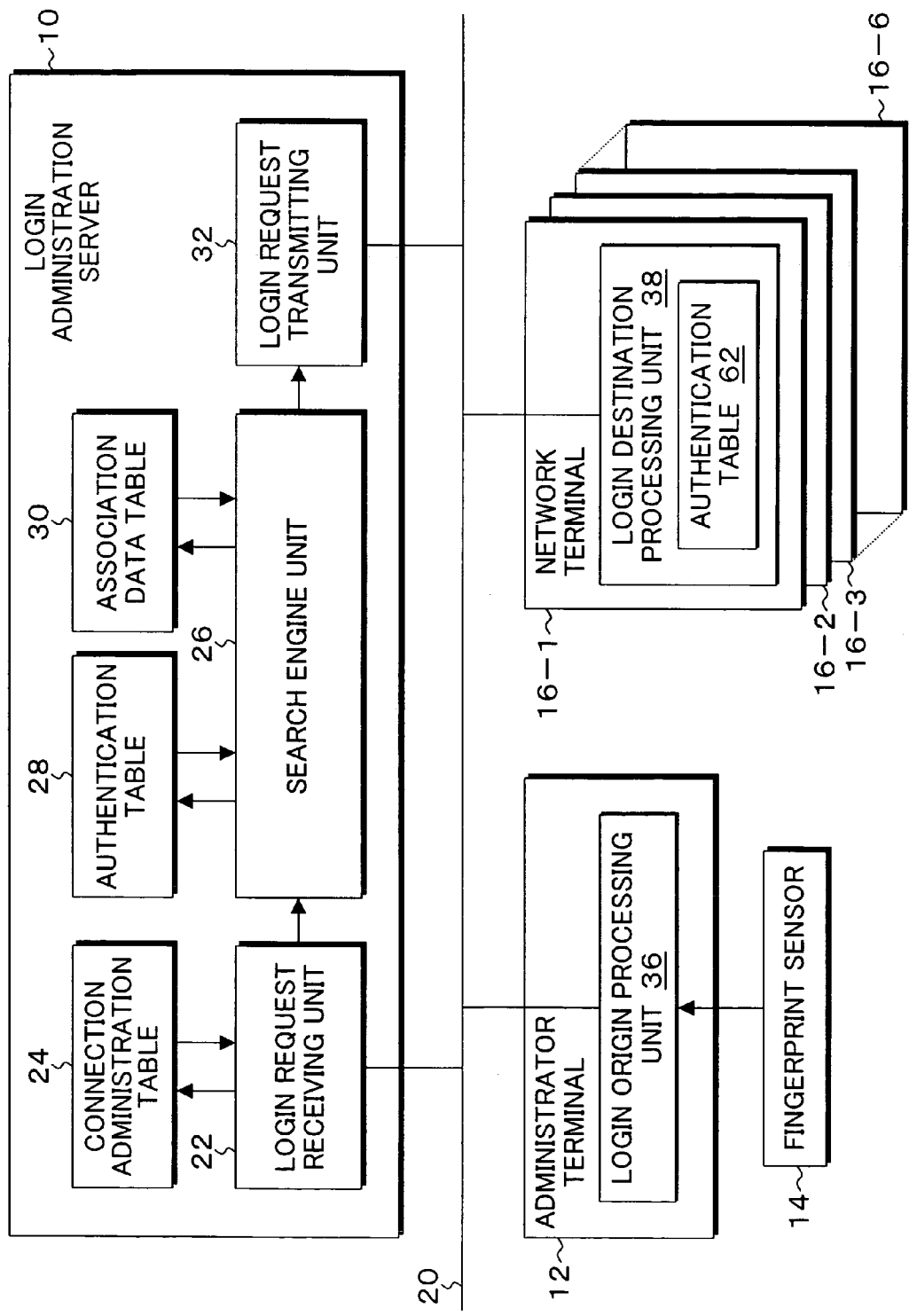
FIG. 3 is a block diagram of a functional configuration showing an embodiment of a login administration server according to the present invention.

FIG. 3 is a functional configuration block diagram of the login administration server 10 according to one embodiment of the present invention. In FIG. 3, in the login administration server 10, a login request receiving unit 22, a connection administration table 24, a search engine unit 26 which functions as an authentication processing unit, an authentication table 28, an association data table 30 which is a specific example of a data table, and a login request transmitting unit 32 are provided. On the other hand, in the administrator terminal 12 which functions as a first information processing apparatus connected to the login administration server 10 via a network 20 of Ethernet or the like, a login origin processing unit 36 and the fingerprint sensor 14 which inputs fingerprints of the administrator are provided. In each of the network terminals 16-1 to 16-6 which are connected via the network 20 and function as second information processing apparatuses, a login destination processing unit 38 having an authentication table 62 is provided.

FIG. 4 is an explanatory diagram of the connection administration table 24 provided in the login administration server 10. The connection administration table 24 is composed of entry Nos. and login substitute response terminals. In the present embodiment, corresponding to the entry Nos. 0 to 3, the addresses of the network terminals 16-1 to 16-4 serving as the login substitute response terminals, for example, IP addresses bbbb, cccc, dddd, and eeee are registered. Meanwhile, since the network terminals 16-5 and 16-6 are not used as the login substitute response terminals, they are not registered in the connection administration table 24. Note that the IP address of the administration terminal 12 serving as a login origin is assumed to be aaaa. When a login request including an IP address which is terminal information of a login destination is received from the administrator terminal 12 serving as a login origin terminal, the login request receiving unit 22 of FIG. 3 requests input of a login ID as a shared account and, in the present embodiment, fingerprint information as user biometric information to the login origin terminal and causes it to transmit them. Herein, the login request receiving unit 22 performs a search in the connection administration table 24 shown in FIG. 4 by using the address of the terminal of the login request destination as an entry, recognizes that the login destination is a substitute response terminal when a matched login substitute terminal is found, and transmits a login prompt to the administrator terminal 12 of the login origin so as to request input of the account ID as a shared account and user fingerprint information. The search engine unit 26 functions as a search processing unit; and, when the login request receiving unit 22 receives the login ID serving as a shared account and user fingerprint information from the administrator terminal 12, the search engine unit performs a search in the authentication table 28 by using the login ID and the user fingerprint information as a key, determines successful authentication when an entry which matches the search key is found, and acquires association data including a right upon authentication and login-permitted terminals corresponding to the user of the matched entry from the association data table 30.

FIG. 5 is an explanatory diagram of the authentication table 28 provided in the login administration server 10. In FIG. 5, the authentication table 28 is composed of entry Nos., login terminals, login IDs, and authentication information. In the present embodiment, the entry Nos. are eight entries of 0 to 7, the case in which the address "bbbb" of the network terminal 16-1 is registered as the login terminals is employed as an example, and, also, the case in which two login IDs "root" and "admin" are registered is employed as an example. Furthermore, as the authentication information, fingerprint information of the user names "koike", "aoki", and "tamura" of three people is registered for the login ID "root", and fingerprint information of the user names "tamai", "aoki", "tamura", "kinjoh", and "saeki" of five people is registered for the login ID "admin".

FIG. 6 is an explanatory diagram of the association data table 30 provided in the login administration server 10 of FIG. 3. The association data table 30 corresponds to the fingerprint information of the users registered as the authentication information of the authentication table 28 of FIG. 5, and the corresponding association data is read from the association data table 30 by using the user to whom authentication using the authentication table 28 with respect to a login request is successful as a key. Therefore, in the association data table 30, authentication user names, user rights upon authentication, login permitted terminals for each user name, and passwords corresponding to the login IDs which are the accounts of FIG. 5 are registered. As the authentication user names, the user names whose fingerprint information is registered as the authentication information in the authentication table 28 of FIG. 5 are registered. As the user rights upon authentication, "super user" and "user" are registered in the present embodiment, wherein "user" is a normal access right, whereas "super user" is a special administrator right given to an administrator. Furthermore, as the passwords transmitted to the login terminals, "root" and "admin" which are the login IDs corresponding to the accounts of the authentication table 28 of FIG. 5 are registered. Note that, instead of registering the passwords in the authentication table 28, a process of using the login ID which is the account of an authenticated user as a password without modification may be incorporated to automatically generate the password. Herein, as the rights upon authentication, the user names "koike", "aoki", and "tamai" of three people are registered for the "super user", and the user names "tamai", "aokin", "tamura", "kinjoh", and "saeki" are registered for the right "user" upon authentication. Among these, both "super user" and "user" are registered as the rights upon authentication for "tamai"; thus, the rights of "super user" and "user" are imparted to the authentication user name "tamai". In the field of the login permitted terminals of the association table 30, the terminal addresses of a plurality of terminals which can be logged in at the same time along with authentication of a login request to a particular terminal are registered. For example, for the users "koike" "aoki", and "tamai" for whom "super user" is imparted as the right upon authentication, the terminal addresses "bbbb", "cccc", and "dddd" corresponding to the network terminals 16-1, 16-2, and 16-3 of FIG. 2 are registered as the login permitted terminals. Table registration processes such as new registration, change, and deletion for such entries of the authentication table 28 of FIG. 5 and the association data table 30 of FIG. 6 can be arbitrarily performed in accordance with needs by access to the login administration server 10, for example, from the administrator terminal 12.

Referring again to FIG. 3, when authentication with respect to a login request from the administrator terminal 12 which is a login origin is successful, the login request transmitting unit 32 provided in the login administration server 10 transmits a login request to the network terminal 16-1 which is a login destination, transmits a shared account and a password, or a user name, a shared account, and a password in response to an input request by a login prompt from the network terminal 16-1 so as to log into it, and imparts the right obtained from the association data table 30 upon authentication to the administrator terminal 12. Furthermore, if a login permitted terminal (third information processing apparatus) other than the login destination terminal which is the target of the login request is present among the login permitted terminals of the association data obtained from the association data table 30 upon authentication, the login request transmitting unit 32 similarly transmits a login request to the login permitted terminal, transmits a shared account and a password, or a user name, a shared account, and a password in response to a login prompt from the login destination so as to log into it, and similarly imparts the right obtained from the association data table 30 upon authentication to the administrator terminal 12.

FIGS. 7A and 7B are explanatory diagrams of the authentication tables registered in the network terminals 16-1 to 16-6 which are to be logged in from the login request transmitting unit 32 provided in the login administration server 10 of FIG. 3; wherein either an authentication table 62-1 of FIG. 7A or an authentication table 62-2 of FIG. 7B is used. In the authentication table 62-1 of FIG. 7A, the shared accounts and the passwords are registered. In a login process of the network terminal 16-1 using the authentication table 62-1 of FIG. 7A, a shared account and a password from the login authentication server 10 are transmitted, a search in the authentication table 62-1 is performed, and the authentication succeeds and login is achieved when a matched entry is found. In this case, since the user name is unknown in the network terminal 16-1 side, the log that who did what access cannot be obtained; however, the account and the password that used a login prompt with respect to a login request can be input and transmitted, and there is a merit that a conventional terminal can be used without modification as the network terminal 16-1 of the login destination. On the other hand, in the authentication table 62-2 of FIG. 7B, user names are registered in addition to the shared accounts and the passwords. In a login process of the network terminal 16-1 using the authentication table 62-2 of FIG. 7B, a user name is further transmitted in addition a shared account and a password from the login authentication server 10, a search is performed in the authentication table 62-2, and the authentication succeeds and login is achieved when a matched entry is found. In this case, the log that who did what access can be obtained in the network terminal 16-1 side since the user name is known. However, the user name has to be input and transmitted in addition to the account and the password in response to a login request; therefore, a new login prompt corresponding to them has to be prepared.

Figure 8:
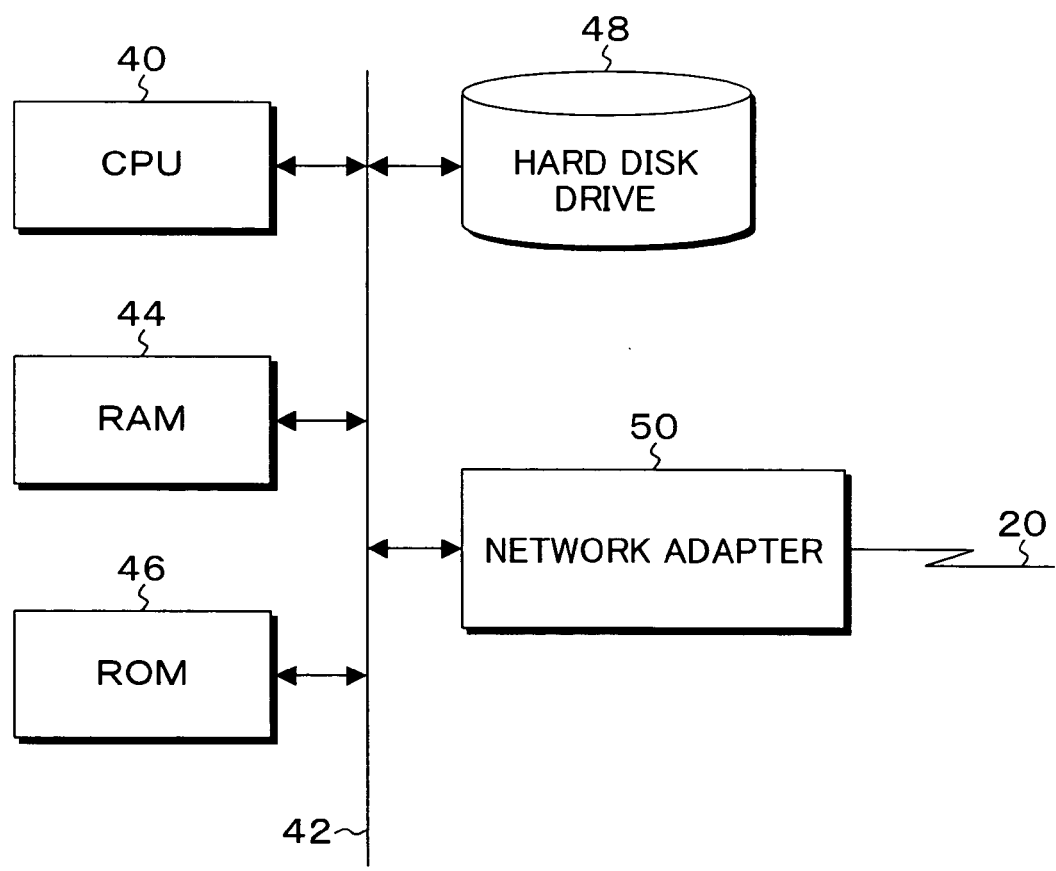
FIG. 8 is a block diagram of a hardware environment of the login administration server of FIG. 3.

FIG. 8 is a block diagram of a hardware environment of the login administration server 10 of FIG. 3. The functions of the login request receiving unit 22, the search engine unit 26, and the login request transmitting unit 32 provided in the login administration server 10 of FIG. 3 are the functions realized by execution of a login administration program installed in the login administration server 10, and the program is executed in the hardware environment of the login administration server 10 as shown in FIG. 8.

In FIG. 8, in a computer which constitutes the login administration server 10, a RAM 44, a ROM 46, a hard disk drive 48, and a network adapter 50 are connected to a bus 42 of a CPU 40. The login administration program of the present embodiment is stored in the hard disk drive 48, and, subsequent to deployment of an OS to the RAM 44 which is subsequent to boot processing upon startup of the computer, the login administration program is read from the hard disk drive 48 to the RAM 44 and executed by the CPU 40. It should be noted that the functions of the administrator terminal 12 and the network terminals 16-1 to 16-6 of FIG. 3 are also realized by executing programs by computers. The hardware environment of the computer has, in addition to the block configuration of FIG. 8, a hardware configuration connected to the bus from the CPU 42 via device interfaces such as a keyboard, a display, and a mouse which perform input/output from or to a user.

Figure 9:
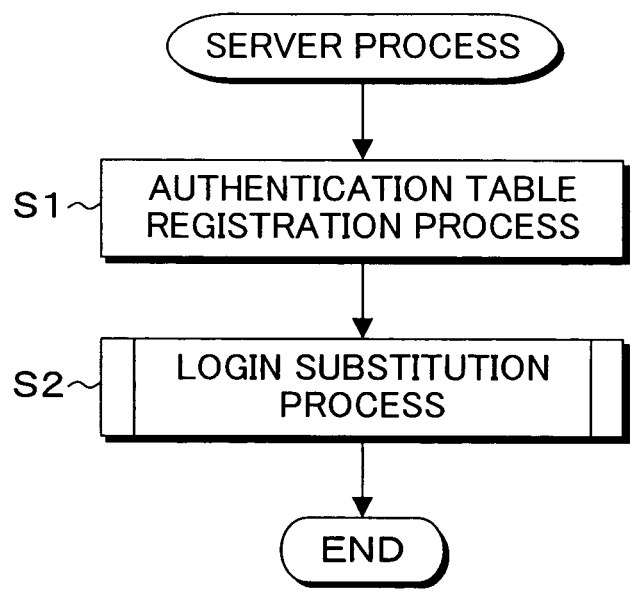
FIG. 9 is a flow chart of an outline process of the login administration server according to the present embodiment.

FIG. 9 is a flow chart of an outline process of the login administration server 10 according to the present embodiment. In the server process of FIG. 9, an authentication table registration process is performed in step S1, and, when the registration is finished, a login substitution process is performed in step S2. In the authentication table registration process, registration, change, deletion of the login substitution response terminals with respect to the connection administration table 24 of FIG. 4, addition, deletion, and change of the entries of the authentication table 28 of FIG. 5, and, along with that, addition, change, and deletion of the entries of the association data table 30 of FIG. 6 are performed. When the authentication table registration process is finished in step S1, the login substitution process of step S2 is executed, and the details thereof will be described later.

Figure 10B:
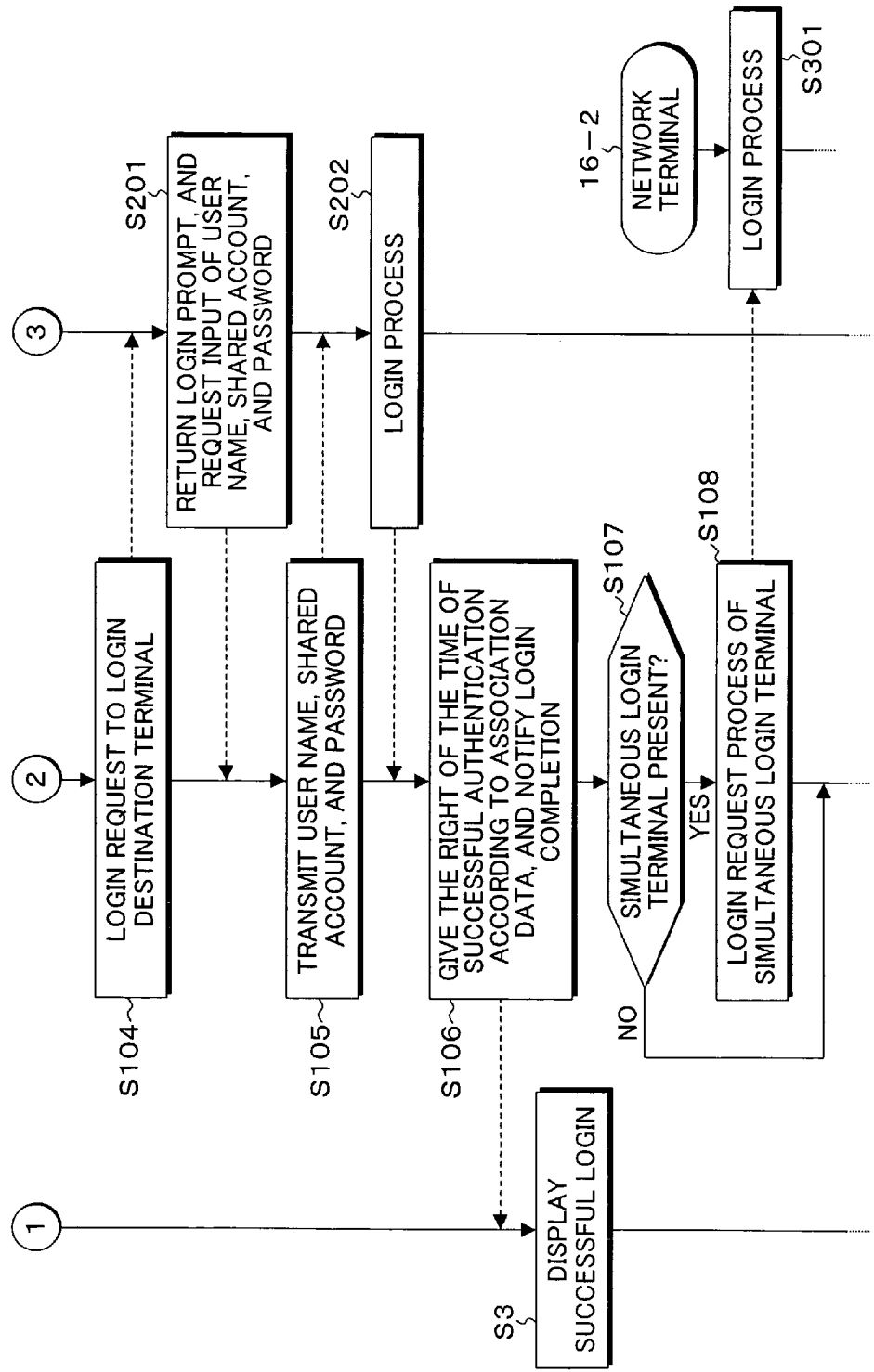

FIGS. 10A and 10B are time charts of a login administration process according to the present embodiment, which employs, as an example, the case in which login is requested to the login administration server 10 by specifying the network terminal 16-1 as a login destination by the administrator terminal 12.

In FIGS. 10A and 10B, in step S1, the administrator terminal 12 specifies the address "bbbb" of the network terminal 16-1 and transmits a login request to the login administration server 10 according to the Telnet protocol. The login administration server 10 which has received the login request from the administrator terminal 12 returns a login prompt in step S101 to request input of a login ID as a shared account and the fingerprint information of the user who uses the administrator terminal 12 for authentication confirmation. In response to this login prompt, in step S2, the administrator terminal 12 inputs the login ID the administrator knows as a shared account input by the administrator and the fingerprint information and transmits them to the login administration server 10.

FIGS. 11A to 11D show the login prompt from the login administration server 10 to the administrator terminal 12 and the screens of the state in which the login ID and the fingerprint information with respect to that are input, wherein the case of a UNIX (R) computer is employed as an example.

Figure 11A:
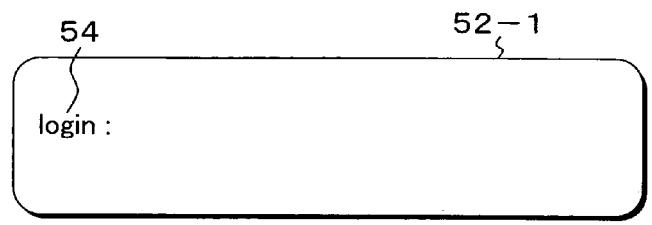
FIGS. 11A to 11D are explanatory drawings of login prompt displayed in the administrator terminal of FIG. 3 and input states of a shared account and fingerprint data.
Figure 11B:
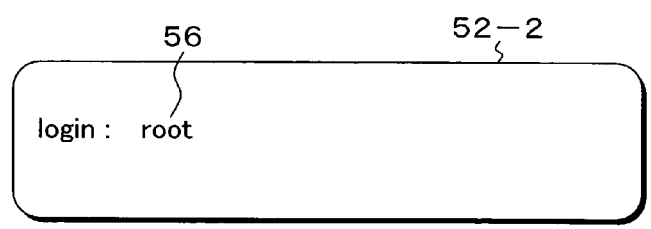
Figure 11C:
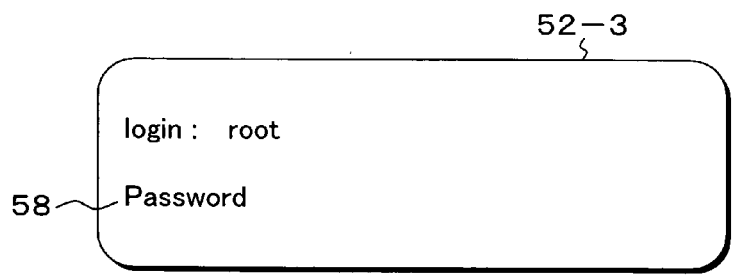
Figure 11D:
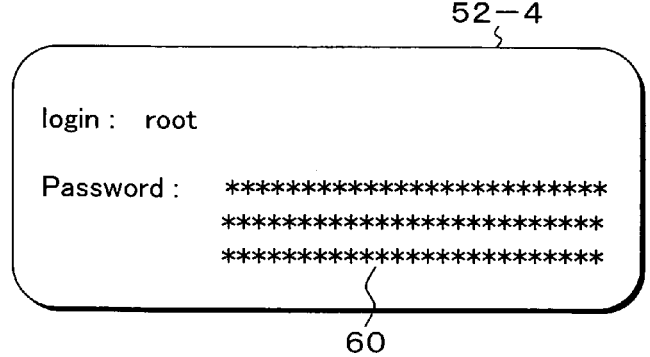

FIG. 11A is a first login prompt 52-1 transmitted from the login administration server 10, wherein "login:" is shown as a display 54 which urges input of a login ID which is a shared account. In response to this, when the administrator inputs "root" which is a login ID 56 serving as a shared account at the administrator terminal 12 by using a keyboard as shown in a login prompt 52-2 of FIG. 11B, it is switched to a login prompt 52-3 as shown in FIG. 11C, and "Password:" is displayed as a password request display 58. Then, when the administrator inputs the fingerprint of the finger, which is determined in advance, for example, the index finger by the fingerprint sensor 14 provided on the administrator terminal 12, fingerprint information 60 is input as shown in a login prompt 52-4 of FIG. 11D and transmitted to the login administration server 10. Herein, the fingerprint image of the administrator read by the fingerprint sensor 14 is information in which feature points of branch points and end points in the fingerprint image are extracted by a feature extraction process of the fingerprint image. Referring again to FIGS. 10A and 10B, the login administration server 10 which has received the login ID and the fingerprint information from the administrator terminal 12 performs a search in the authentication table 28 of FIG. 5 in step S102 by using the address "bbbb" of the login terminal, the login ID "root", which serves as a shared account, and the fingerprint information as a key. When an entry which matches the key is found by the search process, the login administration server 10 determines successful authentication in step S103, and requests login to the network terminal 16-1 which is the login destination terminal in step S104. Meanwhile, if no matching entry is present in step S103, the login administration server 10 notifies the administrator terminal 12 of an error and disconnects the connection in step S109. Furthermore, when the login administration server 10 determines successful authentication in step S103, the user name can be recognized from the fingerprint information obtained by the matched entry of the authentication table, and the association data corresponding to the user name can be acquired from the association data table 30 of FIG. 6. Herein, the login administration server 10 performs the search in the authentication table 28 of FIG. 5 by using the login ID "root" and the fingerprint information as a key. In the example of FIG. 5, the state that the login ID and the fingerprint information of an entry No. 2 of the authentication table 28 indicated by an arrow match the key is shown, wherein "tamai" can be acquired as the user name in this case. Therefore, when the address corresponding to the entry corresponding to the authentication table 28 in the association data table 30 of FIG. 6 (in this case, the fourth entry "tamai" from the top in the association data table 30) is read according to the user name "tamai" obtained by the authentication, the association data indicated by an arrow can be acquired. The acquired association data has "super user" as the right upon successful authentication and includes three "bbbb, cccc, dddd" as the login permitted terminals. When the authentication is successful in step S103 of FIGS. 10A and 10B, the login administration server 10 requests login to the network terminal 16-1 corresponding to the terminal address "bbbb" of the login destination by using the Telnet protocol in step S104. This authentication process performed when the login process from the login administration server 10 to the network terminal 16-1 is performed is an authentication process using an account and a password if the authentication table 62-1 of FIG. 7A is registered in the network terminal 16-1. If the authentication table 62-2 of FIG. 7B is registered in the network terminal 16-1, it is an authentication process using a user name in addition to an account and a password. When the case in which the authentication table 62-2 of FIG. 7B is used herein is employed as an example, in step S106, the login administration server 10 requests login to the network terminal 16-1 serving as a login destination. In response to this, the network terminal 16-1 returns a login prompt in step S201, and requests input of a user name, a shared account, and a password. In response to this login prompt, in step S105, the login administration server 10 transmits the user name "tamai", the shared account "root", and the password "root".

As a login process of step S202, the network terminal 16-1 performs a search in the authentication table 62-2 of FIG. 7B by using the user name, the shared account, and the password received from the login administration server 10 as a key, performs authentication/login by determining whether they match any entry (in this example, the entry indicated by the arrow of FIG. 7B in the authentication table 62-2, and notifies the login administration server 10 of the login completion. In step S106, in response to the login completion notice of the network terminal 16-1, the login administration server 10 imparts the right obtained from the association data table when the authentication performed in step S102 is successful, in this case, the right of "super user" to the administrator terminal 12, and notifies the administrator terminal 12 of the login completion. Subsequently, the login administration server 10 checks whether other simultaneous login terminals are present in the association data or not in step S 107. In this case, other than the address "bbbb" of the network terminal 16-1 to which the login request is output, "cccc" and "dddd" corresponding to the network terminals 16-2 and 16-3 are present in the association data table; therefore, login processing is requested to another simultaneous login terminal, for example, the network terminal 16-2 in step S108. In this case, the network terminal 16-2 which has received the login request performs authentication by referencing the authentication table wherein the user name, the login ID serving as a shared account, and the password are used as a key as well as the network terminal 16-1 in step 5301; and, when the authentication is successful, the terminal imparts "super user" which is the right obtained from the association data in the login administration server 10 and notifies the administrator terminal 12 of the login completion. This point is also same for the network terminal 16-3 of the terminal address "dddd".

Figure 12A:
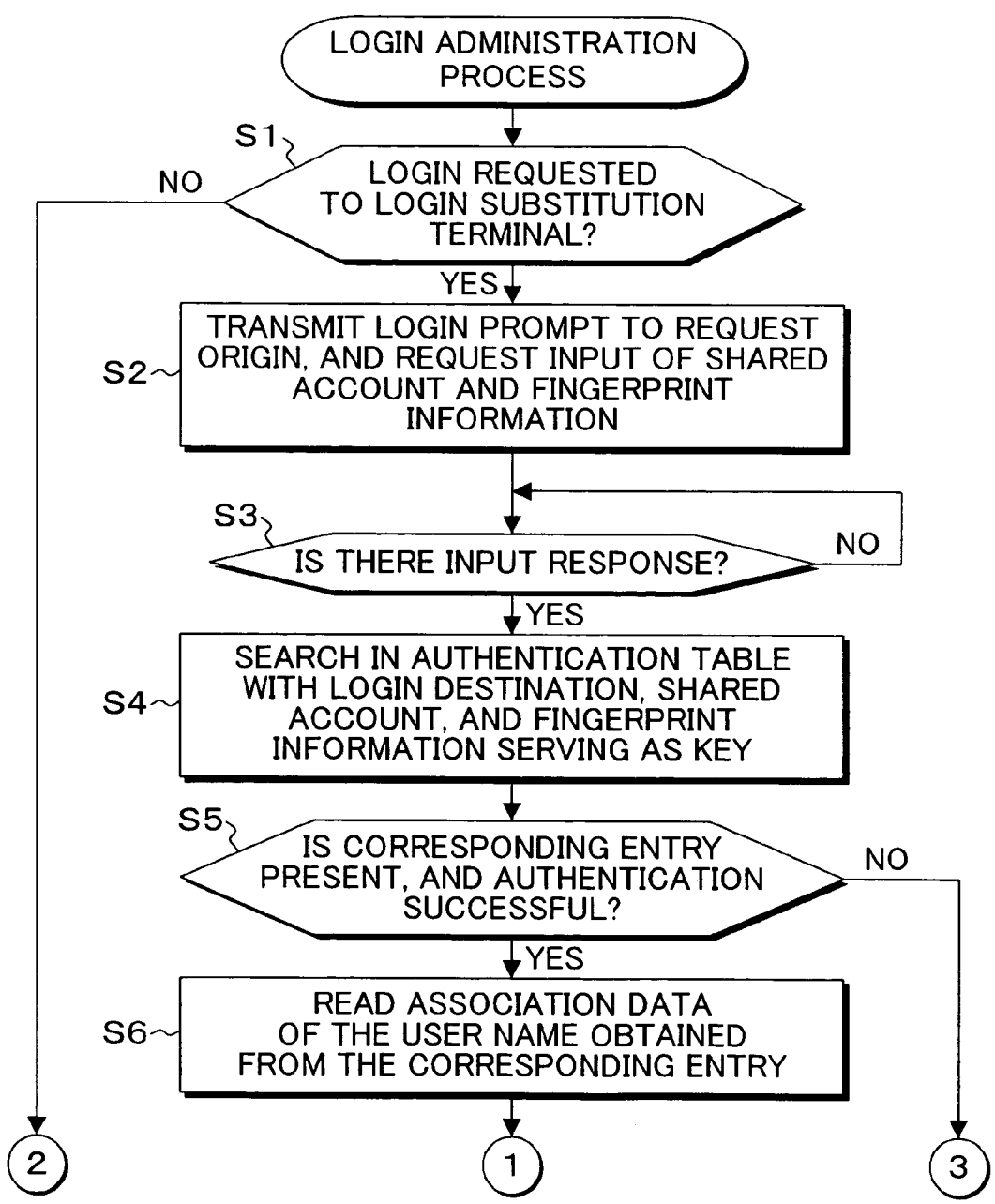
FIGS. 12A and 12B are flow charts of a login administration process according to the present embodiment.
Figure 12B:
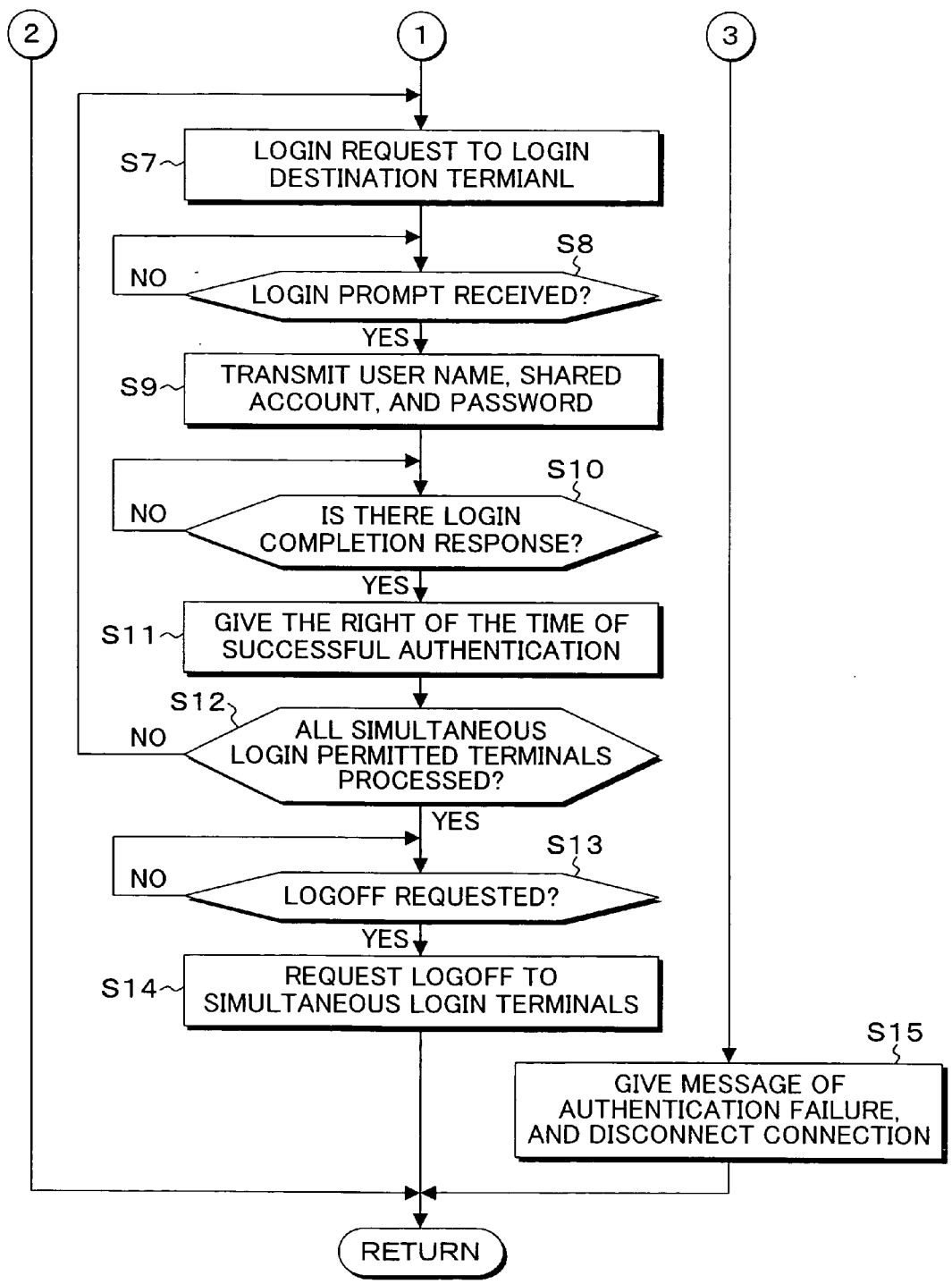

FIGS. 12A and 12B are flow charts of the login administration process according to the present embodiment, and it will be described below with reference to FIG. 3. In FIGS. 12A and 12B, in the login administration process, in step S1, the login request receiving unit 22 checks whether there is a login request or not to any login substitution destination terminal administered by the connection administration table 24. When there is a login request from the administrator terminal 12, the login request receiving unit 22 of the login administration server transmits a login prompt to the administrator terminal 12 which is the login origin and requests input of a login ID serving as a shared account and the fingerprint information of the user in step S2. When an input response from the administrator terminal 12 with respect to the login prompt is determined in step S3, the search engine unit 26 in the login administration server performs a search in the authentication table 28 by using the login ID serving as a shared account and the fingerprint information for the login destination terminal as a key in step S4. In the search of the authentication table 28, when an entry which matches the login ID received from the administrator terminal is determined in step S5, the authentication succeeds; and, in step S6, the search engine unit 26 in the login administration server reads association data from the association data table 30 according to the address of the matched entry in the authentication table 62 and notifies the login request transmitting unit 32 of that. If the authentication does not succeed in step S5, a message about the authentication failure is sent to the administrator terminal which has output the login request, and the connection is disconnected in step S15. When the association data is read in step S6, the login request transmitting unit 32 of the login administration server requests login to the terminal of the login destination, for example, to the network terminal 16-1 in step S7. When the login request transmitting unit 32 of the login administration server receives a login prompt from the terminal of the login destination (network terminal 16-1) in step S8, the transmitting unit inputs and transmits the login ID serving as the shared account and the password in response to the login prompt in the case of the authentication table 62-1 of FIG. 7A or inputs and transmits the user name in addition to the login ID serving as the shared account and the password in the case of the authentication table 62-2 of FIG. 7B in step S9. Consequently, authentication according to the login ID and the password is performed in the network terminal 16-1 of the login destination; and, when the authentication succeeds, login is achieved, and the network terminal 16-1 returns a login completion response to the login administration server. Then, when the login request transmitting unit 32 of the login administration server determines the login completion response from the network terminal 16-1 of the login destination in step S10, the right upon authentication success obtained from the association data is imparted to the administrator terminal which requested the login, and a response about login completion is made to the administrator terminal 12 which is the login origin in step S11. Subsequently, the login request transmitting unit 32 of the login administration server checks whether login processes for all the simultaneous login permitted terminals are finished or not according to the association data in step S12. If they are unprocessed, the process returns to step S7, and the process of requesting login to a next simultaneous login permitted terminal and imparting the right upon authentication to the administrator terminal is repeated. When the login processes of all the simultaneous login permitted terminals of the association data are finished, the process proceeds to step S13, in which whether a logoff is requested from the administrator terminal or not is monitored/determined. When logoff with respect to the network terminal 16-1 to which the login has been requested is requested from the administrator terminal 12 in this state, the process proceeds to step S14, in which the login request transmitting unit 32 of the login administration server requests logoff to the simultaneous login permitted terminals including the network terminal 16-1 to which logoff is requested, and the process is terminated. The present embodiment also provides the login administration program executed by the login administration server 10 of FIG. 3, and the program has the contents shown in the flow chart of FIGS. 12A and 12B. The present embodiment also provides a computer readable recording medium storing the program of the flow chart of FIGS. 12A and 12B. Examples of the recording medium include portable storage mediums such as a CD-ROM, a floppy disk (R), a DVD disk, a magneto-optical disk, and an IC card; storage devices such as a hard disk provided inside/outside a computer system; a database or another computer system and a database thereof which retains the program via a line; and a transmission medium on a line. It should be noted that the present invention is not limited to the above described embodiment, includes arbitrary modifications that do not impair the objects and advantages thereof, and is not limited by the numerical values shown in the above described embodiment.

What is claimed is:

1. A login administration method of a server to which a plurality of information processing apparatuses that log in directly by an account and user-specific information are connected and which performs a login process to other information processing apparatuses in response to a login request from a first information processing apparatus, the login administration method comprising:

registering accounts and user-specific information of a plurality of information processing apparatuses in the server;

receiving the account and user-specific information from the first information processing apparatus in response to the login request from the first information processing apparatus;

authenticating the login request from the first information processing apparatus based on a judgment whether the account and user-specific information received from the first information processing apparatus are corresponding to an account and user-specific information which are registered in the server in advance, wherein in the authentication process, upon authentication of the login request, presence of other information processing apparatuses to which the user who uses the first information apparatus can log in are determined, when the other information processing apparatuses are present, the login requests including the password are transmitted to all of the other information processing apparatuses, and a login substitution authentication is performed by the server;

logging in to all the apparatuses serving as login targets at the same time by one login operation by the login substitution authentication performed by the server;

wherein the first information processing apparatus is an administrator terminal; and the account, which includes both the account received from the first information processing apparatus and the account registered in the server in advance, is a shared account shared by the plurality of information processing apparatuses.

2. The login administration method according to claim 1, characterized in that, in the login request transmission, when login to the other information processing apparatus are achieved, a user right which is registered in the server in advance is imparted to the first information processing apparatus.

3. The login administration method according to claim 1, characterized in that, in the login request transmission, login is achieved by transmitting a user name in addition to the account and the password.

4. A server to which a plurality of information processing apparatuses that log in directly by an account and user-specific information are connected and which performs a process of login from a first information processing apparatus to other information processing apparatuses, the server comprising:

an authentication table in which an account of a login request and user-specific information which is specific to a user who uses the information processing apparatus are registered;

a data table in which a password corresponding to the account is registered;

an authentication processing unit which authenticates the login request from the user in accordance with a judgment whether the account and user-specific information received from the first information processing apparatus in response to a login request from the first information processing apparatus are corresponding to an account and user-specific information registered in the authentication table, wherein in the authentication processing unit, upon authentication of the login request, presence of other information processing apparatuses to which the user who uses the first information apparatus can log in are determined, when the other information processing apparatuses are present, the login requests including the password are transmitted to all of the other information processing apparatuses by a login request transmitting unit, and a login substitution authentication is performed by the server;

logging in to all the apparatuses serving as login targets at the same time by one login operation by the login substitution authentication performed by the server;

wherein the first information processing apparatus is an administrator terminal;

the account, which includes both the account received from the first information processing apparatus and the account registered in the server in advance, is a shared account shared by the plurality of information processing apparatuses; and the user-specific information is biometric information of a relevant user.

5. The server according to claim 4, characterized in that, the login request transmitting unit imparts a user right which is registered in the server in advance to the first information processing apparatus when login to the other information processing apparatuses are achieved.

6. The server according to claim 4, characterized in that, the login request transmitting unit achieves login by transmitting a user name in addition to the account and the password.

* * * * *